Dec. 23, 1952 R. H. GARDNER Re. 23,600

ELECTRIC TOASTER

Original Filed Dec. 5, 1947 3 Sheets-Sheet 1

INVENTOR.
Roland H. Gardner
BY
Harry S. Demarse
ATTORNEY.

Dec. 23, 1952 R. H. GARDNER Re. 23,600

ELECTRIC TOASTER

Original Filed Dec. 5, 1947 3 Sheets-Sheet 2

INVENTOR.
Roland H. Gardner
BY Harry S. Ducasse
ATTORNEY.

Dec. 23, 1952 R. H. GARDNER Re. 23,600

ELECTRIC TOASTER

Original Filed Dec. 5, 1947 3 Sheets-Sheet 3

INVENTOR.
Roland H. Gardner
BY Harry S. Duncan
ATTORNEY.

Reissued Dec. 23, 1952 Re. 23,600

UNITED STATES PATENT OFFICE 23,600

ELECTRIC TOASTER

Roland H. Gardner, North Canton, Ohio, assignor to The Hoover Company, North Canton, Ohio, a corporation of Ohio Original No. 2,585,455, dated February 12, 1952, Serial No. 789,867, December 5, 1947. Application for reissue August 19, 1952, Serial No. 305,312

21 Claims. (Cl. 99—329)

Matter enclosed in heavy brackets [ ] appears in the original patent but forms no part of this reissue specification; matter printed in italics indicates the additions made by reissue.

The present invention relates to electric bread toasters and more particularly to a thermal timer for timing the duration of the toasting interval whereby the operator may obtain toast cooked exactly as desired.

This invention relates to the same general class of toaster timers disclosed and claimed in an application filed by Anthony G. Horvath, Serial No. 721,225, filed January 10, 1947, and is an improvement over and simplification of a timer of the same general character.

As in the Horvath application referred to the thermal timer is allowed to cool after each toasting operation before a succeeding operation can be begun and no toasting operation can be begun until the thermal timer has reached its proper temperature.

Also, as in the Horvath application, the operator may insert new slices and move the toast carriers to toasting position immediately after a previous toasting operation and the timer will automatically initiate the succeeding toasting operation without further attention from the operator as soon as the timer has reached its proper timing temperature.

According to this invention an auxiliary heater for the timer is connected in series with the main heaters and an auxiliary switch is held in open position until the timer has cooled before a succeeding toasting operation can be begun even though the bread carriers are moved to toasting position immediately after a previous toasting operation.

Heat is transmitted directly from the auxiliary heater to the timer by radiation and also by reflection by means of a reflector positioned on the opposite side of the heater from the timing element. According to this invention both the auxiliary heater and reflector are moved bodily toward and away from the timer both manually and by a thermally responsive compensating element.

The manual means moves the auxiliary heater and reflector toward and away from the timer in adjusting for light, medium, or dark toast. The action of the thermostatic compensating element is superimposed on the manual means so as to also move the auxiliary heater and reflector toward and away from the timer depending upon the ambient temperature of the toaster.

It is well known that thermal timers of the heat-up type have a tendency to over-compensate. That is, as the toaster temperature rises with rapid repeated use of the toaster the temperature of the timer also rises but at a faster rate. As a result, if some means is not provided to prevent it, the toast will be successively more and more underdone for each succeeding toasting operation. Accordingly, the thermally responsive compensating element of this invention moves the auxiliary heater and reflector farther and farther away from the timer with succeeding toasting operations as the toaster heats up so as to lengthen each toasting interval after the first and thus compensate for the tendency of the timer to over-compensate. This action will continue until a position of equilibrium is reached.

According to another feature of this invention the thermally responsive compensating element determines the toasting interval for any particular toasting operation responsive to the temperature of the toaster at the initiation of the toasting operation. That is, the thermally responsive compensating element will not vary any toasting interval after the toasting operation has begun regardless of a rise in toaster temperature during the toasting operation.

That feature is especially useful in timing the first toasting interval starting with a cold toaster because if the timing interval is changed during such a toasting interval the toast may be overdone. This comes about by reason of the fact that the heating elements of the toaster come up to toasting temperature very rapidly even though the toaster as a whole is still cold. As a result, if the toasting interval should be lengthened during the toasting operation, the toast would be overdone.

According to another feature of this invention manual means is provided for bodily moving the auxiliary heater and reflector toward and away from the timer in such a manner that for dark toast the auxiliary heater and reflector is positioned farther away from the timer.

When the manual means is set for dark toast the toasting interval is longer than it would be for light or medium toast. As a result the toaster as a whole heats up more and so does the timer. Thus, the auxiliary heater and reflector will have to be moved farther away from the timer by the thermally responsive compensating element for dark toast in order to prevent over-compensation than would be the case for medium or light toast.

Thus another important feature of this invention is the arrangement whereby the thermally responsive compensating element will move the auxiliary heater and reflector farther away from the timer when the manual means is set for dark toast than it will when it is set for medium or light toast; or farther away from the timer when the manual means is set for medium toast in comparison to when it is set for light toast.

According to a modification of this invention the auxiliary heater and reflector are mounted rigidly with respect to the bread carriers while the timer is mounted on the base below the auxiliary heater and reflector. The manually adjustable means for adjusting for light, medium, or dark toast and the thermally responsive compensating element then determines the lowermost position of the bread carriers so as to vary the distance between the auxiliary heater and reflector and the timer.

According to another feature of this invention, the manually adjustable means determines the position of an abutment which in turn determines the position of a wedge actuated by the thermally responsive compensating element that cooperates with a similar wedge to determine the position of the auxiliary heater and reflector. The slope of the wedges is such that the force exerted by the compensating element is not sufficient to move the intermediate wedge, and thereby increase the distance between the auxiliary heater and reflector, and the timer after a toasting operation is begun. That is, the thermally responsive compensating element can easily move the intermediate wedge when the carriers are in upward position but cannot move it when the carriers have been moved to toasting position. Thus, the distance between the timer and auxiliary heater and reflector is fixed at the initiation of a toasting operation and accordingly the timed interval is also fixed at the initiation of a toasting operation.

Other objects and advantages of this invention will become apparent as the description proceeds when taken in connection with the accompanying drawings in which.

Figure 2:
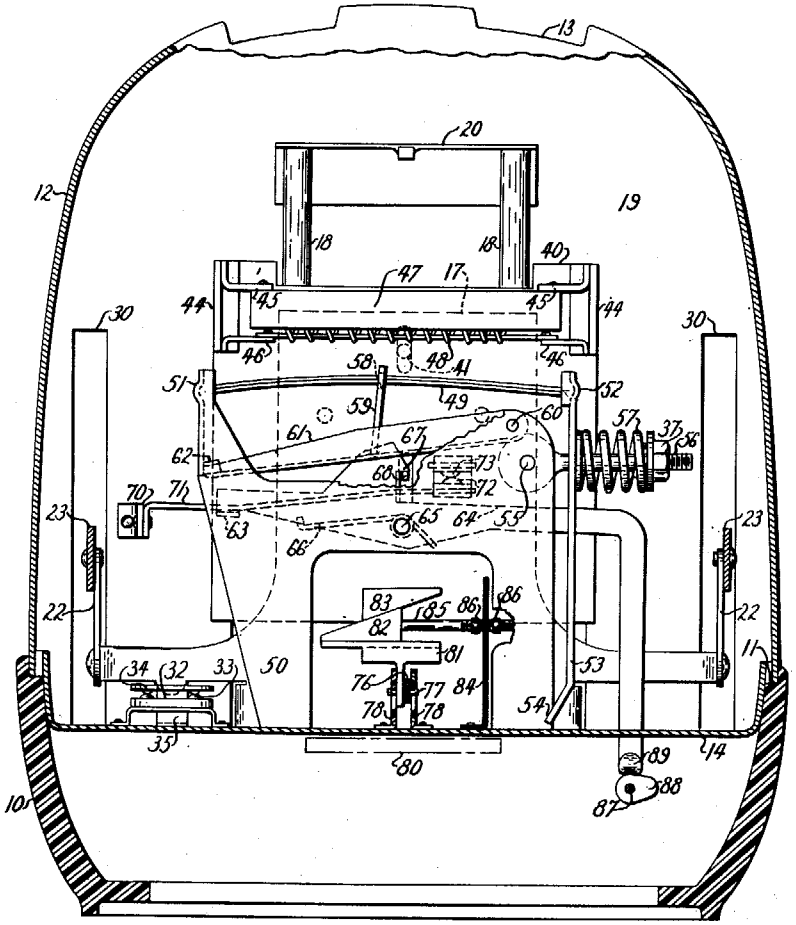
Figure 2 is a cross-sectional view of a toaster showing a front elevation of the parts of the timer of Figure 1.

Referring to the drawings the reference numeral 10 represents the base for the toaster of this invention. The base 10 is molded of hard rubber, a phenolic condensation product or other suitable moldable material. Mounted on a ledge 11 of the base 10 is the lower edge of an appearance housing 12 having slots 13 through which bread may be inserted as will presently appear. Supported inwardly of the ledge 11 is a supporting plate 14 which supports the entire mechanism of the toaster and timer positioned within the appearance housing 12.

A plurality of bread carriers 15 are positioned beneath the slots 13. The carriers 15 are carried by lugs 16 which extend rearwardly from a carriage plate 17 mounted for vertical movement by a plurality of rods 18 as is well known in the art. At their lower ends the rods 18 are attached to the supporting plate 14 and at their upper ends are attached to a dividing plate 19 by a bracket 20. The dividing plate 19 divides the interior of the toaster into a toasting oven and a mechanism compartment.

Extending rearwardly from the carriage plate 17 are a pair of lugs 21. Pivoted at their lower ends to the lugs 21 are a pair of links 22 which are pivoted at their upper ends to a pair of arms 23. At their rear end the arms 23 are pivoted to the side walls of the toasting oven as at 24, and at their forward ends are extended forwardly at 25 through a slot 26 in the front of appearance housing 12. A manipulating handle 27 is attached to the forwardly extending ends 25 of the arms 23.

Figure 3:
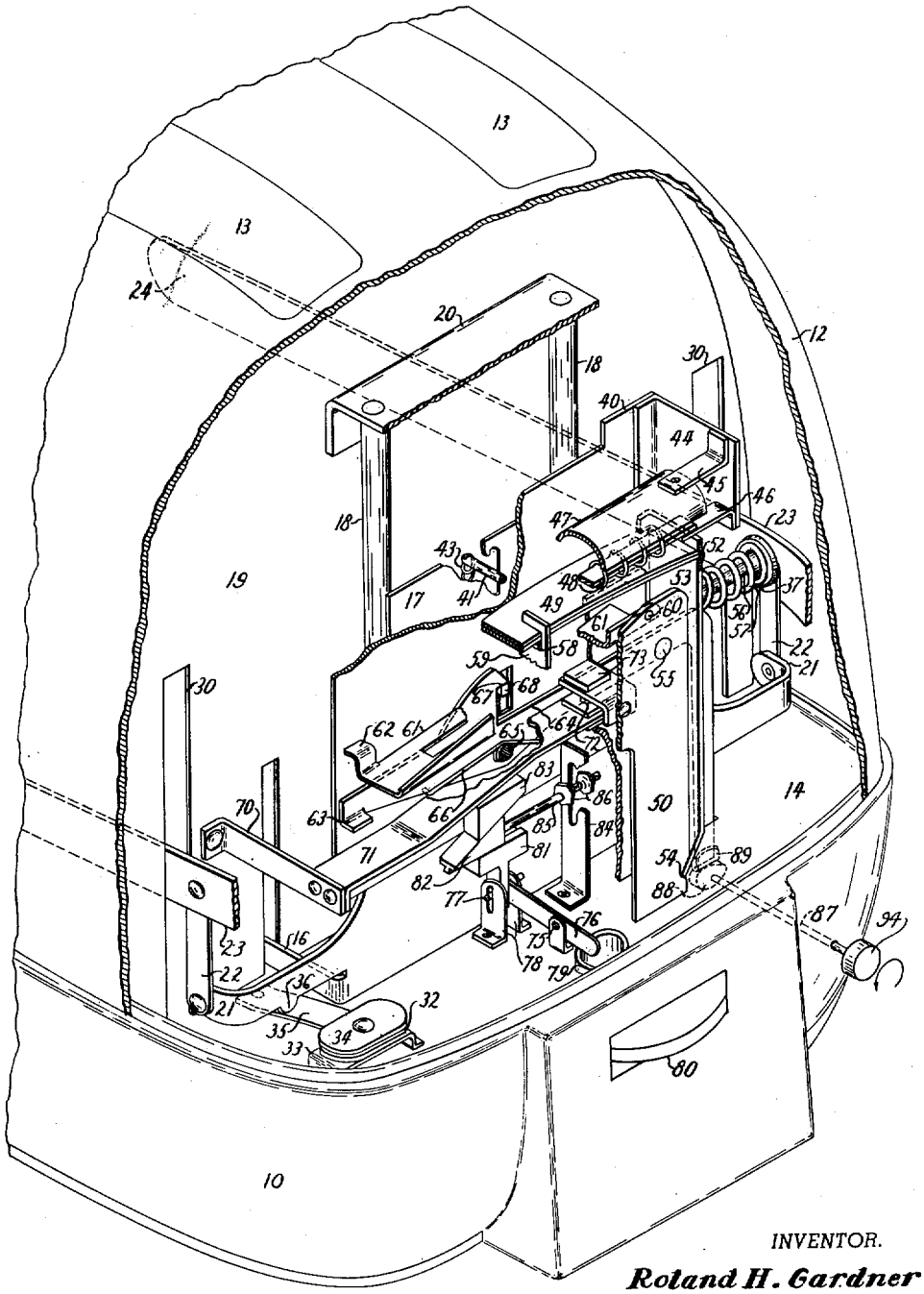
Figure 3 is a perspective view of a toaster with the parts broken away to better show the parts of the timer of Figure 1.

The carriers 15, carriage plate 17, and arms 23 are biased to receiving position by a spring 28 anchored at its upper end to the bracket 20 and at its lower end to a hook 29 on the extensions 25 of the arms 23. A pair of vertically extending slots 30 are provided in the dividing plate 19 to provide for vertical reciprocation of the arms 23. Similar slots are provided for the vertical reciprocation of the lugs 16 which support the carriers 15 as shown in Fig. 3.

Electric heaters 31 of any suitable construction are positioned on opposite sides of the carriers 15 to perform the toasting function. The heaters 31 are adapted to be energized by switch 32 when the carriage plate 17 is moved to downward position under certain conditions as will presently appear. The switch 32 comprises a fixed contact 33 insulatedly secured to the supporting plate 14 and a movable contact 34 on the end of a spring arm 35 also insulatedly supported on the supporting plate 14. The spring arm 35 normally holds the contacts 34 and 33 apart. A lug 36 on the carriage plate 17 closes the contacts 34 and 33 against the bias of the spring arm 35 when the carriage plate 17 is moved to downward position.

Figure 1:
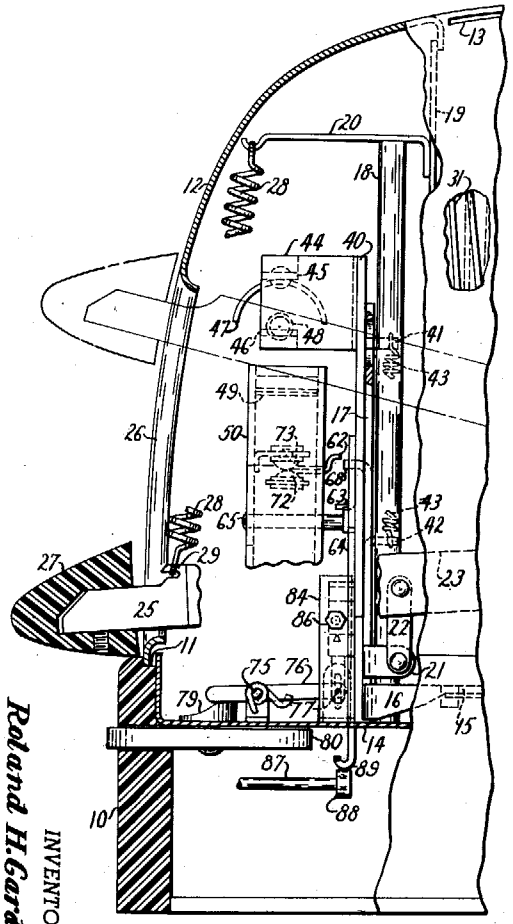
Figure 1 is a vertical side view of a toaster with the parts broken away to show one modification of the timer of this invention.

Mounted for vertical reciprocation on the carriage plate 17 is an auxiliary carriage 40. A pin 41 extends rearwardly from the auxiliary carriage 40 through a slot in the carriage plate 17. A spring 43 has its upper end anchored to the pin 41 and its lower end anchored to a lug 42 extending rearwardly from carriage plate 17 as best shown in Fig. 1. The auxiliary carriage 40 is secured to the carriage plate 17 in any suitable manner such as by bolts or rivets extending through the slots in the carriage plate 17 so that the spring 43 normally holds the auxiliary carriage 40 in its lowermost position, relative to the carriage plate 17, against a suitable stop.

Extending forwardly from the auxiliary carriage 40 are a pair of plates 44. Upper and lower angle brackets 45 and 46 are secured to plates 44 and extend toward each other as shown in Figure 2. The upper angle brackets 45 carry a reflector 47 and the lower angle brackets 46 carry an auxiliary heater 48 positioned immediately below the reflector 47.

Positioned immediately below the auxiliary heater 48 and the reflector 47 in a position to receive heat from the auxiliary heater 48 when the carriage plate 17 is in downward position, is a bimetal timer 49. The timer 49 is supported from the supporting plate 14 by an upwardly extending plate 50 having a recessed abutment 51 to receive one end of the timer 49. The other end of the timer 49 is positioned in a recessed abutment 52 in the upper end of a plate 53 pivoted to the plate 50 and at 54.

Pivoted to the plate 50 by a pin 55 is an eye bolt 56 which carries a compression spring 57, abutting at one end against the plate 53 and at the other end against a nut 37. Rotation of the nut 37 will compress the spring 57 to place a compressive force on the bimetal timer 49 in the direction of its length so that it will snap to an upper over-center position or to a lower over-center position as will presently appear.

Pivoted to plate 50 at 60 is a lever arm 61 having at its free end a rearwardly extending lug 62 that cooperates with a lug 63 on a carriage latch 64 pivoted to the plate 50 at 65. The carriage latch 64 is spring-biased clockwise as viewed in Fig. 2 against a suitable stop by a spring 66. The latch 64 has a hook 67 which is adapted to overlie a lug 68 struck forwardly from the carriage plate 17 to latch the carriage plate 17 in downward position.

A member 59 is struck upwardly from the arm 61 and has a slot 58 extending inwardly from its side to receive the central portion of the bimetal 49.

Figure 6:
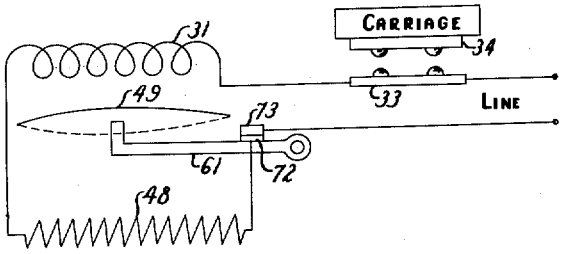
Figure 6 is a wiring diagram depicting how the parts are electrically connected.

Mounted on the dividing plate 19 at 70 is a spring arm 71, which at its free end insulatedly carries an electric contact 72. The spring arm 71 normally biases the contact 72 into engagement with a fixed electric contact 73 insulatedly carried by the plate 50. The spring arm 71 is positioned below the free end of the arm 61 and forwardly of lug 63 of latch 64 so that when the arm 61 moves downwardly its free end will engage the spring arm 71 and disengage the contacts 72 and 73 and permit the lug 63 to move upwardly as will later appear. The contacts 72 and 73 are connected in series with the contacts 33 and 34 of switch 32 and in series with the main heaters 31 and the auxiliary heater 48 as shown in Fig. 6.

Pivoted between its ends to the supporting plate 14 at 75 is a lever arm 76. The inner end of arm 76 carries a pin 77 which is vertically slidable in brackets 78 carried by the supporting plate 14. The other end of the arm 76 cooperates with a cam 79 carried by a hand wheel 80 rotatably supported by the supporting plate 14 and having its edge extending through a slot in the front of base 10 for ease of manipulation.

The pin 77 carries the lower end of an abutment 81 which cooperates with a pair of wedge shaped abutments 82 and 83. Abutment 83 extends forwardly from the auxiliary carriage 40 while the abutment 82 is adapted to be moved back and forth by a compensating bimetal 84 extending upwardly from the supporting plate 14. The abutment 82 is connected to the bimetal 84 by a bolt 85 which extends through a slot in the bimetal 84. A pair of nuts 86 are threaded on the bolt 85 on opposite sides of the bimetal 84 to form shoulders for moving the abutment 82 as the bimetal 84 flexes.

A shaft 87 extends forwardly through the front of the base 10 to the side of the hand wheel 80. The shaft 87 carries a cam 88 which cooperates with the end 89 of carriage latch 64 so that by rotation of the knob 94 the cam 88 will pivot the carriage latch 64 counter-clockwise as viewed in Fig. 2 to release the carriage plate 17 independently of the timer.

OPERATION

As shown in Fig. 1 the hand wheel 80 is set so that the highest point of cam 79 is in engagement with the arm 76 which will cause the abutment 81 to be moved to its lowermost position. This is the setting for light toast as will presently appear.

The operator will then insert bread through the openings 13 in the appearance housing 12 so as to rest on carriers 15 and move carriers 15 and carriage plate 17 downwardly against the bias of spring 43 by manipulation of the handle 27. The spring 43 will carry the auxiliary carriage 40 along with the carriage plate 17 until the abutment 83 thereon engages the abutment 82. Since the compensating bimetal 84 is cold at this time the abutment 82 will be positioned to the right of the position shown in Figure 2. This will cause the auxiliary heater 48 and the reflector 47 to be positioned immediately above and relatively close to the bimetal timer 49.

Movement of the carriage plate 17 to downward position will cause the lug 68 on the carriage plate 17 to ride over the hook 67 on carriage latch 64 which will latch the carriers 15 in toasting position between the heaters 31. The lug 36 on carriage plate 17 will also engage the spring 35 and close the contacts 33 and 34. Since at this time the timer 49 is cold it will be in its upper over-center position and the arm 61 will be in its upper position so as to permit the spring 71 to close the contacts 72 and 73 causing both the main heaters 31 and the auxiliary heater 48 to be simultaneously energized.

Heat from the auxiliary heater 48 will be radiated directly to the bimetal timer 49 and also reflected thereto from the reflector 47. This will cause the bimetal 49 to move downwardly past its dead center position so that the tension of the spring 57 will snap it to its lower over-center position. The central part of the bimetal timer 49 will engage the lower edge of the slot 58 in the member 59 and pivot the arm 61 counterclockwise as viewed in Fig. 2.

The arm 61 has considerable inertia and when the timing bimetal 49 snaps to its lower over-center position the arm 61 will move counterclockwise with considerable force. Its free end will first contact the spring 71 and open the contacts 72 and 73. The dynamic inertia of the arm 61 will cause it to continue to move until the lug 62 contacts the lug 63 of carriage latch 64 so as to remove the hook 67 from above the lug 68 to release the carriers 15 for upward movement. It has been found in practice that when the bimetal timer snaps to its lower over-center position it will move considerably past its normal lower position to release the latch as described but that it will immediately recover and move upwardly to its normal lower position. The spring 66 will then return the carriage latch 64 to its original position the lug 63 bypassing the spring arm 71. The relation of parts is such that the free end of arm 61 will still engage the spring 71 to hold contacts 72 and 73 apart.

At the same time the spring 28 will move the carriers 15, the carriage plate 17 and the auxiliary carriage 40 with the auxiliary heater 48 and reflector 47 to upward position so that the finished toast will project through the openings 13 and the auxiliary heater 48 and reflector 47 will be moved away from the bimetal timer 49 so as to permit it to quickly cool.

During the above operation the abutment 82 will remain in the position shown in Fig. 2 even though the compensating bimetal 84 is heated somewhat during the toasting operation. This comes about by reason of the fact that the slope of the wedge surfaces on the abutments 82 and 83 is such that the compensating bimetal 84 cannot move the abutment 82 when the wedge surfaces are held in frictional contacts by the spring 43 which holds the auxiliary carriage 40 in downward position.

This feature is particularly useful for the first toasting operation starting when the toaster is cold. This is due to the fact that the toaster does not contain any residual heat at the start of the first toasting operation. If the bimetal 84 could move the abutment 82 to the left, the auxiliary heater 48 and reflector 47 would move away from the timing bimetal 49 and lengthen the toasting cycle with the result that the toast would be overdone. However, when the pressure on the abutment 83 is removed the compensating bimetal 84 will immediately move the abutment 82 to the left so that for succeeding toaster operations, the heater 48 and reflector 47 will be positioned farther from the timer bimetal 49, so as to lengthen the toasting interval for succeeding toasting operations.

Had the operator desired dark toast, the hand wheel 80 would have been rotated until the low place on the cam 79 engaged the arm 76. This would have moved the abutment 81 upwardly so that when the carriage plate 17 is moved downwardly the auxiliary heater 48 and reflector 47 would have been positioned farther away from the timing bimetal 49 so as to lengthen the toasting period.

When the abutment 81 is moved upwardly the abutment 82 will also move upwardly so as to position the pin 85 higher in the slot of the compensating bimetal 84. This causes the compensating bimetal 84 to move the abutment 82 farther to left, as it compensates for rises in ambient toaster temperature, when the timer is set for dark toast than when set for light toast; and, consequently, the auxiliary heater 48 and reflector 47 will be moved farther from the timing bimetal 49 than when adjusted for preparing light toast. This fact is an advantage for, when the toaster is hot after a preceeding toasting operation and the timer is set for dark toast it has been found that there is a greater tendency for the toast to be underdone than when the timer is set for light toast. Accordingly, the compensating bimetal 84 moves the abutment 82 so that the auxiliary heater 48 and reflector 47 will be positioned farther from the timer bimetal 49 so as to lengthen the toasting interval and assure that the toast will not be underdone.

After the first toasting operation is completed the operator can immediately initiate a second toasting operation even though the timing bimetal 49 has not cooled. Bread may be inserted and the handle 27 moved downwardly as before. The hook 67 of the latch 64 will engage over the lug 68 of carriage plate 17 and latch the carriage down as before. The lug 36 will engage the spring 35 and close the contacts 33 and 34. However, neither of the main heaters 31 nor the auxiliary heater 48 will be energized because the free end of arm 61 is in engagement with the spring 71 to hold the contacts 72 and 73 apart.

Within a few seconds the timing bimetal 49 will have cooled sufficiently to snap back to its upper over-center position. The upper edge of the slot 58 in lug 59 will be engaged by the central portion of the timing bimetal 49 so as to move the arm 61 clockwise as viewed in Fig. 2.

The free end of arm 61 will be removed from engagement with the spring 71 to permit the contacts 72 and 73 to close and reenergize both the main heaters 31 and the auxiliary heater 48.

The operation will continue as before except that the compensating bimetal 84 will have moved the abutment 82 to the left to position the auxiliary heater 48 and reflector 47 farther from the timing bimetal 49 and lengthen the second toasting interval over the first to compensate for the tendency of the timing bimetal 49 to overcompensate.

Figure 4:
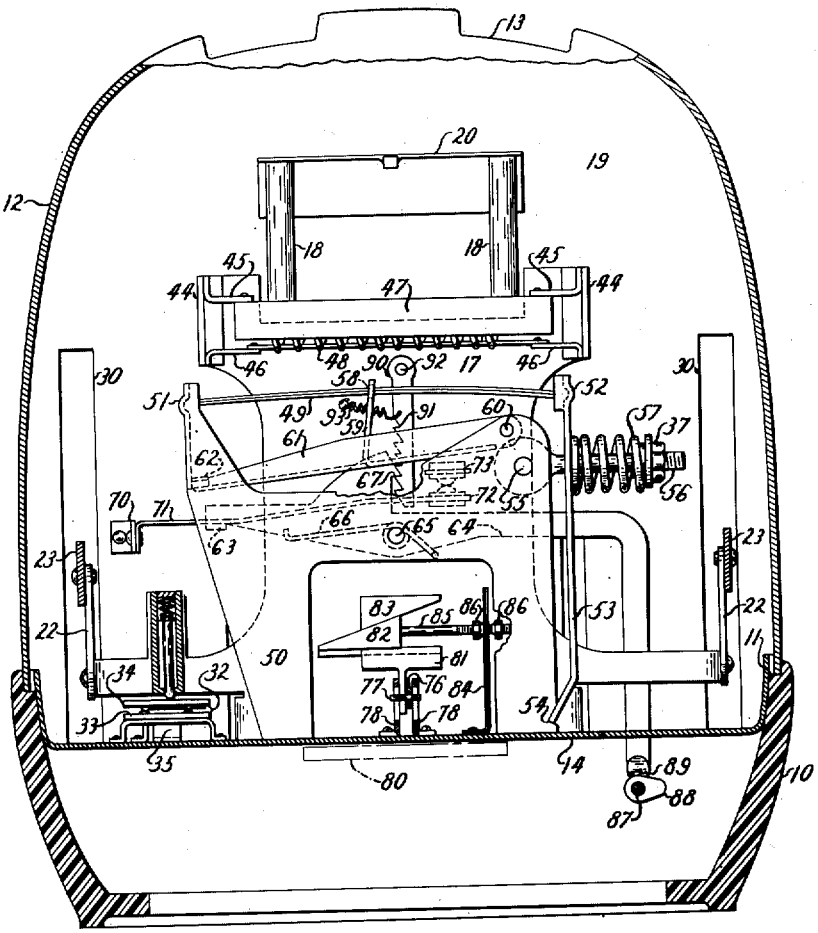
Figure 4 is a cross sectional view of a toaster showing a front elevation view of a second modification of the timer of this invention.
Figure 5:
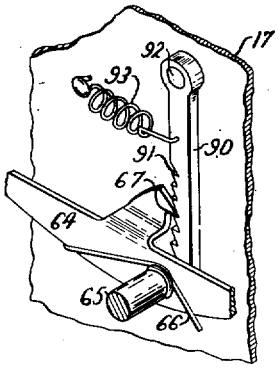
Figure 5 is a perspective view of the latch down mechanism of Figure 4.

The modification of Figures 4 and 5 is similar to that of Figs. 1, 2, and 3 except for the manner in which the carriers are latched in downward position. Where the parts are the same the same reference characters have been applied. In this modification the auxiliary carrier 40 of Figs. 1 to 3, inclusive, and its associated parts have been omitted. The auxiliary heater 48, reflector 47, and their supporting structure have been attached directly to the carriage plate 17. The abutment 83 is also carried by the carriage plate 17.

The hook 67 of the carriage latch 64 cooperates with a plurality of serrations 91 of movable latch arm 90 pivoted to the carriage plate 17 at 92. The latch arm 90 is spring-biased clockwise by a spring 93. A suitable stop is provided to limit the clockwise movement of the latch arm 90. A spring loaded plunger is provided for contacting the spring arm 35 for closing the contacts 33 and 34.

The operation of this modification is substantially the same as before. The hand wheel 80 is manipulated to position the stop 81 for light, medium, or dark toast as before. The compensating bimetal 84 will position the stop 82 as before. The abutment 83 being mounted on the carriage plate 17 will contact abutment 82 to limit the downward movement of the carriage plate 17 and correspondingly the distance of the auxiliary heater 48 and reflector 47 from the bimetal timer 49.

The hook 67 of carriage latch 64 will engage one of the serrations 91 of latch arm 90 depending upon the position of the abutments 81 and 82.

When the timing bimetal 49 snaps to its downward over-center position the lug 62 of arm 61 will engage the lug 63 of carriage latch 64 with a hammer blow to move the hook 67 out of serrations 91 and permit the carriers and associated parts to move upwardly. At the same time the contacts 33 and 34, and 72 and 73 will be opened to end the toasting cycle.

The modification of Figures 4 and 5 differs over over that of Figs. 1 to 3, inclusive, only in that in the modification of Figs. 1 to 3, inclusive, the distance the carriers 15 move downwardly is fixed while in the modification of Figs. 4 and 5 that distance is variable. In both modifications the lower position of the reflector and auxiliary heater is variable depending upon the position of the abutments 81 and 82 which in turn are determined by the setting of the hand wheel 80, and by the position of the compensating bimetal 84.

In both modifications the action of the compensating bimetal 84 in moving abutment 82 is superimposed upon the action of the manually adjustable wheel 80 in positioning abutment 81 so that a greater compensation is provided by the compensating bimetal 84 when the toaster is set for dark toast than when it is set for light or medium toast.

In both modifications the position of the reflector 47 and the auxiliary heater 48 with relation to the timing bimetal 49 and correspondingly the duration of the toasting interval is fixed at the initiation of any particular toasting operation and will not change during that operation.

While I have shown but two modifications of my invention it is to be understood that these modifications are to be taken as illustrative only and not in a limiting sense. I do not wish to be limited to the particular structure shown and described but to include all equivalent variations thereof except as limited by the scope of the claims.

I claim:

1. A toaster comprising, main heaters for performing a toasting function, bread carriers movable from receiving to toasting position, a thermal timer for timing the duration of toasting intervals, a heater for said timer carried by said carriers above said timer, means for moving said carriers to toasting position adjacent said main heaters, manually adjustable stop means positioned to engage said carriers for limiting downward movement thereof so as to determine the relative position of said timer and heater and thereby determine the duration of the toasting interval, control means actuatable upon movement of said carriers to toasting position for energizing said heaters to initiate a toasting interval and means actuated by movement of said timer to actuate said control means to terminate the toasting interval.

2. A toaster according to claim 1 including a thermally actuatable stop superimposed upon said manually adjustable stop means.

3. A toaster according to claim 2 in which said thermally actuatable stop and said manually actuatable stop coact with each other and with said carriers to fix the position of the latter at the initiation of a toasting interval.

4. A toaster comprising, a base, main heaters for performing a toasting function, a thermal timer mounted on said base, bread carriers movable from bread receiving to toasting position adjacent said main heaters and being spring-biased to receiving position, an auxiliary carriage slidably mounted on said bread carriers for vertical reciprocation and being spring-biased to downward position, a heater mounted on said auxiliary carriage in a position to be located above said timer when said carriers are moved to toasting position, means for moving said carriers to toasting position, manually adjustable stop means for arresting movement of said auxiliary carriage as said carriers are moved to toasting position to position said heater above said timer, control means actuatable to control said heaters to initiate a toasting interval and means actuated by said timer for terminating a toasting interval after its initiation.

5. A toaster according to claim 4 including thermally responsive means responsive to toaster temperature at the initiation of a toasting operation for fixing the position of said arresting means.

6. A toaster according to claim 4 in which said manually adjustable stop means and means responsive to toaster temperature positions said arresting means toward and away from said base for determining the position of said heater relative to said timer when said carriers are moved to toasting position.

7. A toaster comprising, a base, main heaters for performing a toasting function, bread carriers movable from an upper receiving to a lower toasting position adjacent said main heaters, means for moving said carriers to toasting position, a thermal timer mounted on said base for timing the duration of a toasting interval, a heater carried by said carriers in a position to be located above said timer when said carriers are moved to toasting position, variable means for limiting downward movement of said carriers to locate said heater a distance above said timer when said carriers are moved to toasting position, means for latching said carriers in toasting position, said latching means being constructed to latch said carriers in a plurality of vertical positions depending upon the position of said variable limiting means, control means actuatable to control said heaters to initiate a toasting interval and means actuated by said timer for terminating a toasting interval after its initiation.

8. A toaster according to claim 7 in which said latch means comprises a hooked carriage latch pivoted to said base and a serrated latch arm pivoted to said carriers, the arrangement being such that the hook of said carriage latch will engage one of the serrations of said latch [arms] *arm* when said carriers are moved to toasting position.

9. A toaster comprising, a base, main heaters for performing a toasting function, a thermal timer mounted on said base, a carriage movable from an upper position to a lower position adjacent said main heaters, a heater carried by said carriage in a position to be located above said timer when said carriage is moved to lowered position, a wedge shaped abutment carried by said carriage, an abutment mounted on said base beneath said wedge shaped abutment, a second wedge shaped abutment positioned between the first mentioned abutments and means for moving said wedge shaped abutments horizontally relative to each other so as to move the wedge surfaces thereof relative to each other and thus vary the distance between said heater and timer when said carriers are moved to downward position, control means actuatable to control said heaters to initiate a toasting interval and means actuated by said timer for terminating a toasting interval after its initiation.

10. A toaster according to claim 9 including thermally responsive means for moving said second wedge shaped abutment horizontally in response to variations in toaster temperature so as to vary the distance between said heater and timer with variations in toaster temperature.

11. A toaster according to claim 9 including manually operable means for moving said base mounted abutment toward and away from said base to vary the position of said heater relative to said timer to thus vary the duration of the toasting interval in adjusting for light, medium or dark toast.

12. A toaster according to claim 9 including thermally responsive means for moving said second wedge shaped abutment back and forth between said first wedge shaped abutment and said base mounted abutment responsive to variations in toaster temperature and manually operable means for moving said base mounted abutment toward and away from said base for manually adjusting for light, medium, or dark toast, the arrangement being such that the movement [of] *produced by* said thermally responsive means is greater when said manually operable means is set for dark toast than when it is set for light or medium toast.

13. A toaster comprising, main heaters for performing a toasting function, bread carriers movable from receiving to toasting position adjacent said main heaters, a thermal timer for timing the duration of toasting intervals, a heater for said timer, means actuatable upon movement of said carriers to toasting position for energizing said heaters and initiate a toasting interval, manually actuatable means for moving said heater toward and away from said timer in adjusting for light, medium or dark toast, thermal means responsive to toaster temperature superimposed upon said manually actuatable means for varying the position of said heater relative to said timer irrespective of the setting of said manually actuatable means, said manually actuatable means coacting with said thermal means to position said heater farther away from said timer with a given rise in toaster temperature when said manually actuatable means is set to position said heater at the maximum distance from said timer, and control means actuated by movement of said timer to terminate the toasting interval.

14. A toaster comprising, a base, main heaters for performing a toasting function, a thermal timer supported by said base, bread carriers movable from a receiving position to a toasting position adjacent said main heaters, an auxiliary carriage carried by said carriers and movable therewith and relative thereto, a heater for said timer carried by said auxiliary carriage in a position to be adjacent said timer when said carriers are moved to toasting position, manually adjustable stop means engageable with said auxiliary carriage for limiting the downward movement thereof in order to space said heater and said timer so as to fix the timing period of said timer, control means responsive to movement of said auxiliary carriage to downward position actuatable to control said heaters to initiate a toasting interval and means actuated by said timer for terminating a toasting interval after its initiation.

15. A toaster according to claim 14 including a thermally actuatable stop means superimposed upon said manually actuatable stop means and an abutment carried by said auxiliary carriage positioned to contact said thermally actuatable stop means when said carriers are moved to toasting position.

*16. A toaster comprising, a toasting oven, main heaters within said oven, a movable bread carrier within said oven, means for moving said carrier from a receiving position to a toasting position adjacent said heaters, a thermal timer of the heat-up type for timing the duration of successive toasting intervals, an auxiliary heater for said timer, means actuated as an incident to movement of said carrier to toasting position for moving said auxiliary heater toward said timer and for energizing said heaters, a secondary thermal means positioned to be responsive to oven temperature and movable in response to changes in oven temperature, stop means actuated by movement of said secondary thermal means for varying the final distance of said auxiliary heater from said timer, said means being constructed and arranged to prevent movement of said secondary thermal means during the toasting intervals initiated when said oven is cold and means actuated by movement of said thermal timer upon being heated for deenergizing said heaters.*

*17. A toaster comprising, a toasting oven, main heaters within said oven, a movable bread carrier within said oven, means for moving said carrier from a receiving position to a toasting position adjacent said heaters, a thermal timer for timing the duration of toasting intervals, an auxiliary heater for said timer, means activated as an incident to movement of said carrier to toasting position for moving said auxiliary heater toward said timer and for energizing said heaters, a movable stop positioned to limit the movement of said heater toward said timer, a compensating bimetal having a free end movable in response to changes in oven temperature, said stop being positioned to be moved by movement of the free end of said compensating bimetal, coacting stop means carried by said auxiliary heater moving means and coacting with said stop for preventing movement of said stop when said carrier is in its toasting position and means actuated by movement of said thermal timer operable to deenergize said main heaters.*

*18. A toaster comprising, a toasting oven, main heaters within said oven, a movable bread carriage within said oven, said carriage being movable from a bread receiving position to a toasting position adjacent said heaters, a thermal timer for timing the duration of toasting intervals, an auxiliary beater for said timer, mounting means for mounting said heater for movement toward and away from said timer and being spring-biased toward said timer, carriage moving means for moving said carriage from receiving position to toasting position, means for moving said auxiliary heater away from said timer when said carriage moves to receiving position, a compensating bimetal positioned to be responsive to variations in oven temperature, said compensating bimetal having a free end carrying a stop movable into the path of movement of said mounting means to limit the movement of said auxiliary heater toward said timer in dependancy upon the temperature of said oven, the arrangement being such that said mounting means coacts with said stop to prevent movement of said stop by said compensating bimetal when said carriage is in toasting position, means for energizing said heaters to initiate a toasting operation and means actuated by movement of said thermal timer operable to deenergize said main heaters.*

*19. A toaster according to claim 18 including manually actuatable means for moving said stop independently of said compensating bimetal for adjusting said timer for preparing light, medium, or dark toast.*

*20. A toaster comprising, a toasting oven, a thermal timer for timing successive toasting intervals, a heater for said timer, a frame for mounting said heater for movement toward and away from said timer, a bimetal mounted adjacent to a wall of said oven so as to be responsive to oven temperature, movable means for initiating a toasting operation, means rendered operative by said movable means upon initiation of a toasting operation to move said heater toward said timer, stop means carried by said bimetal and cooperating with said frame for determining the final position of said heater relative to said timer, said stop means being so constructed and arranged relative to said frame as to lock said bimetal out of operation when the toasting operation is initiated when the oven is cold and means actuated by movement of said thermal timer operable to terminate toasting operations.*

*21. A toaster according to claim 20 in which said stop means is so formed that the final position of said heater is progressively moved farther away with each succeeding toasting operation as successive toasting operations are initiated in rapid succession.*

ROLAND H. GARDNER.

(References on following page)

REFERENCES CITED

The following references are of record in the file of this patent or in original patent:

UNITED STATES PATENTS

| Number | Name | Date |
|---|---|---|
| 2,112,422 | McCullough et al. | Mar. 29, 1938 |
| 2,179,422 | Myers et al. | Nov. 7, 1939 |

| Number | Name | Date |
|---|---|---|
| 2,196,394 | Ireland | Apr. 9, 1940 |
| 2,268,655 | Gomersall | Jan. 6, 1942 |
| 2,347,385 | Wright et al. | Apr. 25, 1944 |
| 2,404,976 | McCullough et al. | July 30, 1946 |
| 2,436,735 | Walder et al. | Feb. 24, 1948 |
| 2,558,199 | Scharf | June 26, 1951 |